United States Patent
Srinivasan et al.

(10) Patent No.: US 12,271,862 B2
(45) Date of Patent: Apr. 8, 2025

(54) INTERNET OF THINGS FLEET INVENTORY ITEM LINKING/UNLINKING

(71) Applicant: Oracle International Corporation, Redwood Shores, CA (US)

(72) Inventors: Arvind Srinivasan, Pondicherry (IN); Garima Dhanania, Telangana (IN); Sourath Roy, Karnataka (IN); Chitta Ranjan Swain, Bangalore (IN); Akshay Rastogi, Pulgama (IN)

(73) Assignee: Oracle International Corporation, Redwood Shores, CA (US)

( * ) Notice: Subject to any disclaimer, the term of this patent is extended or adjusted under 35 U.S.C. 154(b) by 456 days.

(21) Appl. No.: 17/718,497

(22) Filed: Apr. 12, 2022

(65) Prior Publication Data
US 2023/0162143 A1  May 25, 2023

(30) Foreign Application Priority Data

Nov. 25, 2021  (IN) .............................. 202141054414
Dec. 9, 2021  (IN) .............................. 202141057220

(51) Int. Cl.
*G06Q 10/087* (2023.01)
*G06F 16/23* (2019.01)
(Continued)

(52) U.S. Cl.
CPC ....... *G06Q 10/087* (2013.01); *G06F 16/2365* (2019.01); *G06Q 10/06315* (2013.01);
(Continued)

(58) Field of Classification Search
CPC .... G06Q 40/12; G06Q 10/107; G06Q 20/405; G06Q 30/0185; G06Q 40/02;
(Continued)

(56) References Cited

U.S. PATENT DOCUMENTS

| | | |
|---|---|---|
| 7,755,541 B2 | 7/2010 | Wisherd et al. |
| 10,382,294 B2 | 8/2019 | Bali et al. |

(Continued)

FOREIGN PATENT DOCUMENTS

| | | |
|---|---|---|
| CN | 104866999 A | 8/2015 |
| CN | 107622364 A | 1/2018 |
| WO | 2019075138 A1 | 4/2019 |

OTHER PUBLICATIONS

Unknown, "How it Works", SenseAware, https://www.senseaware.com, last downloaded on Oct. 30, 2020.
(Continued)

*Primary Examiner* — Garcia Ade
(74) *Attorney, Agent, or Firm* — Potomac Law Group, PLLC

(57) ABSTRACT

Embodiments monitor one or more inventory items corresponding to a vehicle. Embodiments generate a trip plan including, for the vehicle, a start location, an end location, and one or more stops, and for each of the inventory items, a pickup location and a drop off location corresponding to the one or more stops. Embodiments, for each of the inventory items, detect that the vehicle has entered the pickup location based on the trip plan and in response automatically link a sensor to the inventory item. Embodiments, for each of the inventory items, detect that the vehicle has entered the pickup location based on the trip plan and in response automatically unlink the sensor from the inventory item.

20 Claims, 13 Drawing Sheets

(51) Int. Cl.
  *G06Q 10/0631* (2023.01)
  *G06Q 10/0833* (2023.01)
  *H04W 4/021* (2018.01)
  *H04W 4/029* (2018.01)

(52) U.S. Cl.
  CPC ........ *G06Q 10/0833* (2013.01); *H04W 4/021* (2013.01); *H04W 4/029* (2018.02)

(58) Field of Classification Search
  CPC .... G06Q 20/38; G06Q 20/389; G06Q 10/087; G06Q 10/06315; G06Q 10/0833; G06F 16/2379; G06F 16/9024; G06F 16/2365; H04W 4/021; H04W 4/029; H04W 4/38; H04W 4/40
  USPC .......................................................... 705/28
  See application file for complete search history.

(56) References Cited

U.S. PATENT DOCUMENTS

| | | | |
|---|---|---|---|
| 10,421,437 B1 | 9/2019 | Koskan | |
| 10,863,302 B2 | 12/2020 | Gonzalez et al. | |
| 10,957,204 B1* | 3/2021 | Kumar | G08G 1/20 |
| 11,830,366 B2 | 11/2023 | Ren et al. | |
| 2004/0243664 A1 | 12/2004 | Horstemeyer | |
| 2010/0007500 A1 | 1/2010 | Mestres et al. | |
| 2011/0050397 A1* | 3/2011 | Cova | G06Q 10/08 340/10.1 |
| 2013/0147617 A1 | 6/2013 | Boling et al. | |
| 2013/0225282 A1 | 8/2013 | Williams et al. | |
| 2016/0232483 A1 | 8/2016 | London et al. | |
| 2016/0379165 A1 | 12/2016 | Moakley | |
| 2017/0127249 A1 | 5/2017 | Li et al. | |
| 2018/0081374 A1* | 3/2018 | Nimchuk | G06Q 10/08355 |
| 2018/0158020 A1 | 6/2018 | Khasis | |
| 2018/0288566 A1 | 10/2018 | Lu | |
| 2020/0064865 A1 | 2/2020 | Lei et al. | |
| 2021/0293555 A1 | 9/2021 | Roherty et al. | |
| 2021/0302979 A1* | 9/2021 | McAlpine | G01C 21/3407 |
| 2022/0046381 A1 | 2/2022 | Ong et al. | |
| 2022/0132274 A1 | 4/2022 | S. et al. | |
| 2023/0147126 A1* | 5/2023 | Iwamoto | G06Q 10/0833 705/333 |
| 2023/0186230 A1 | 6/2023 | Paul et al. | |
| 2023/0188941 A1 | 6/2023 | Palop et al. | |
| 2023/0336940 A1 | 10/2023 | Yim et al. | |
| 2024/0166076 A1 | 5/2024 | Rosenblatt et al. | |

OTHER PUBLICATIONS

Unknown, "Managed Solution for High-Value Asset and fleet Tracking", https://www.sierrawireless.com/products-and-solutions/sims-connectivity-and-cloud-services/managed-iot-solutions/asset-tracking/ 1/, last downloaded on Oct. 30, 2020.
Unknown, "SenseAware is FedEx's IoT response to supply chain optimization", htpps://www.rcrwireless.com/20160929/big-data-anlytics/fedex-iot-tag31, last downloaded on Oct. 30, 2020.
Unknown, "What is SenseAware?", www.senseaware.com, last downloaded on Oct. 30, 2020.
Unknown, Domo IoT Asset Tracking, https://webcache.googleusercontent.com/search?q=cache:A9f7PEUpR_gJ: https://aws.amazon.com/iot/solutions/DomoVerizon/+&cd=1&hl=en&ct=cInk&gl=us, last downloaded on Oct. 30, 2020.
Reclus et al., "Geofencing for Fleet and Freight Management", IIEE Xplore, pp. 353-354, 2009.

* cited by examiner

INTERNET OF THINGS FLEET INVENTORY ITEM LINKING/UNLINKING

One embodiment is directed generally to a computer system, and in particular to fleet item monitoring using a computer system.

BACKGROUND INFORMATION

Large quantities of cargo are transported daily across the continental US and in most other industrial countries using transportation carriers. The use of tractor-trailers as cargo transport vehicles provided by the trucking industry accounts for a significant portion of the vehicles utilized to transport cargo, typically in the form of a "fleet" of trucks. In the trucking industry, cargo is arranged to be transported from an origination point to a destination point via a particular tractor-trailer, driven by an operator/driver.

Remotely monitoring all items associated with a trip is necessary to track inventories and progress in the transport. Specifically, there is a need for real-time end-to-end transportation visibility and insights into business entities, such as vehicle location, condition of containers, status of in-transit inventory, cargo condition, operational costs, vehicle use, and driving behavior.

SUMMARY

Embodiments monitor one or more inventory items corresponding to a vehicle. Embodiments generate a trip plan including, for the vehicle, a start location, an end location, and one or more stops, and for each of the inventory items, a pickup location and a drop off location corresponding to the one or more stops. Embodiments, for each of the inventory items, detect that the vehicle has entered the pickup location based on the trip plan and in response automatically link a sensor to the inventory item. Embodiments, for each of the inventory items, detect that the vehicle has entered the pickup location based on the trip plan and in response automatically unlink the sensor from the inventory item.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

One embodiment is a fleet management system that automatically links and unlinks sensors from inventory items during a transportation trip based on a trip plan. Errors with inventory items during the trip can be detected and corrected based on the linking/unlinking. Dynamic hierarchical digital twins are generated to provide a representation of the items associated with the trip.

In general, a trip typically has multiple inventory items that need to be picked up and dropped off at different stops based on a transportation plan. The inventory items can be monitored in the period between pick up and drop off using sensors (i.e., Internet of things ("IoT") devices). In embodiments, any inventory item gets linked automatically to sensor(s) based on GPS telemetry data from the sensor which is supposed to be linked (i.e., in accordance to the trip plan) to the inventory. The link is established when the trip's geo-location indicates an exit from the geo-fence of a particular item's pickup stop. The inventory item is automatically unlinked from the sensor when the trip enters the geo-fence of the planned drop off stop for the inventory.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
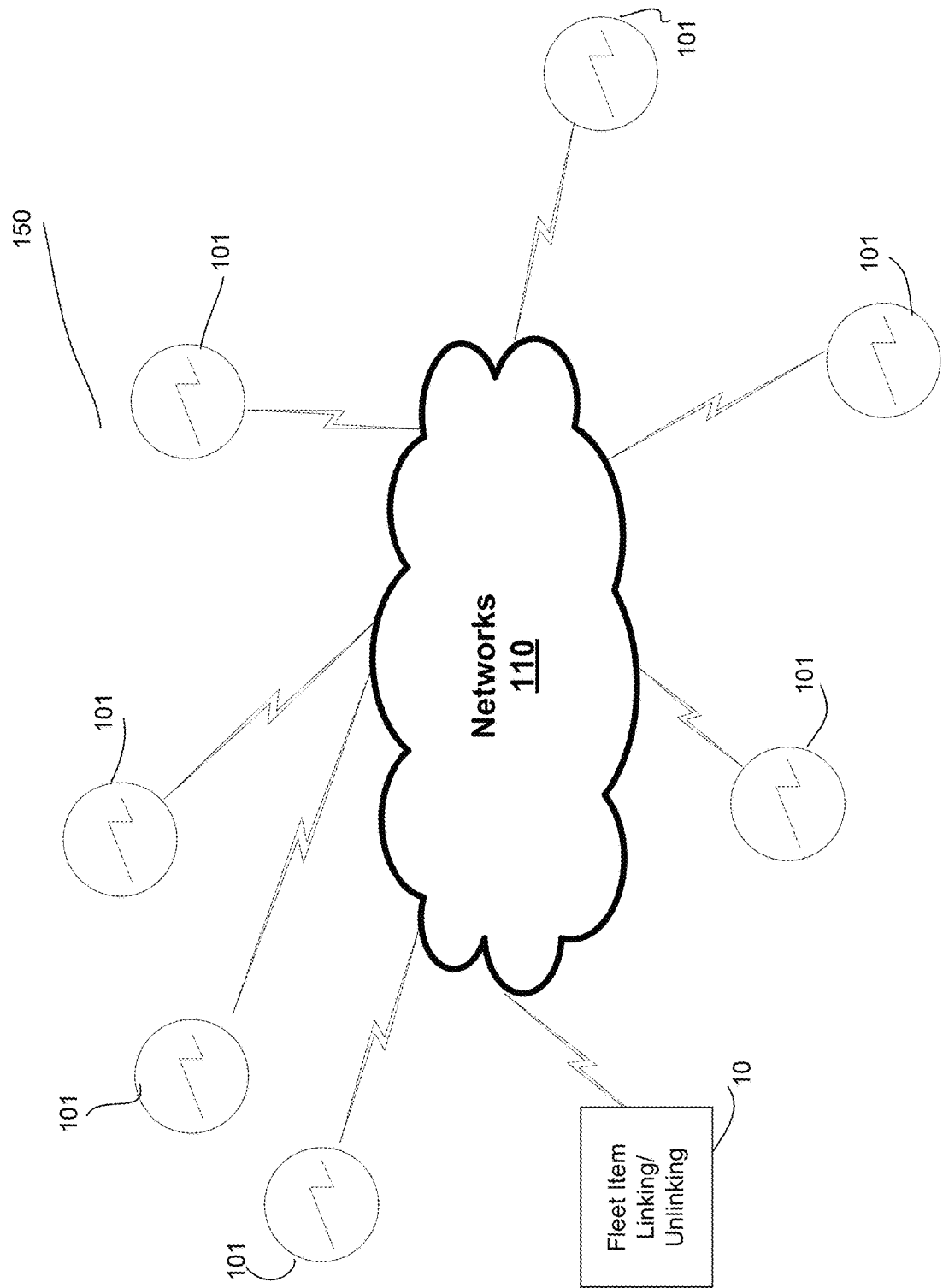
FIG. 1 is an overview diagram of elements of a fleet item linking/unlinking network/system that can implement embodiments of the invention.

FIG. 1 is an overview diagram of elements of a fleet item linking/unlinking network/system 150 that can implement embodiments of the invention. Network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101. For example, for a fleet of "trucks" that are being monitored, each portion of the truck may include a sensor (e.g., the actual truck body and the one or more trailers that are being pulled by the truck, and each item that is loaded into each of the trailers).

An IoT device can be any device that has a sensor attached to it and can transmit data from one object to another or to people with the help of Internet. IoT devices include wireless sensors, software, actuators, and computer devices. They are attached to a particular object that operates through the Internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

Network 150 may be used for a variety of purposes, such as, for example, in the transportation industry, where vehicle fleet management is aided by the continuous acquisition of data by sensors that are attached to vehicles. In this embodiment, sensor network 150 may acquire data that may be monitored and processed for such purposes as aiding vehicle maintenance, optimizing vehicle routes, promoting driver safety, etc. Each of sensors 101 communicate, wirelessly or wired, through one or more networks 110. Networks 110 include the Internet, but may also include private on-premise networks that ultimately interface with the Internet as well as any other type of network that allows sensors 101 to communicate.

A fleet item linking/unlinking server 10 is coupled to networks 110 to send and receive data from sensors 101. Fleet item linking/unlinking 10 provides the fleet item linking/unlinking functionality disclosed herein. In general, fleet item linking/unlinking 10 monitors data acquired by each of sensors 101 for purposes of automatically linking/unlinking sensors from inventory items at the appropriate time and place during a pre-planned trip.

Figure 2:
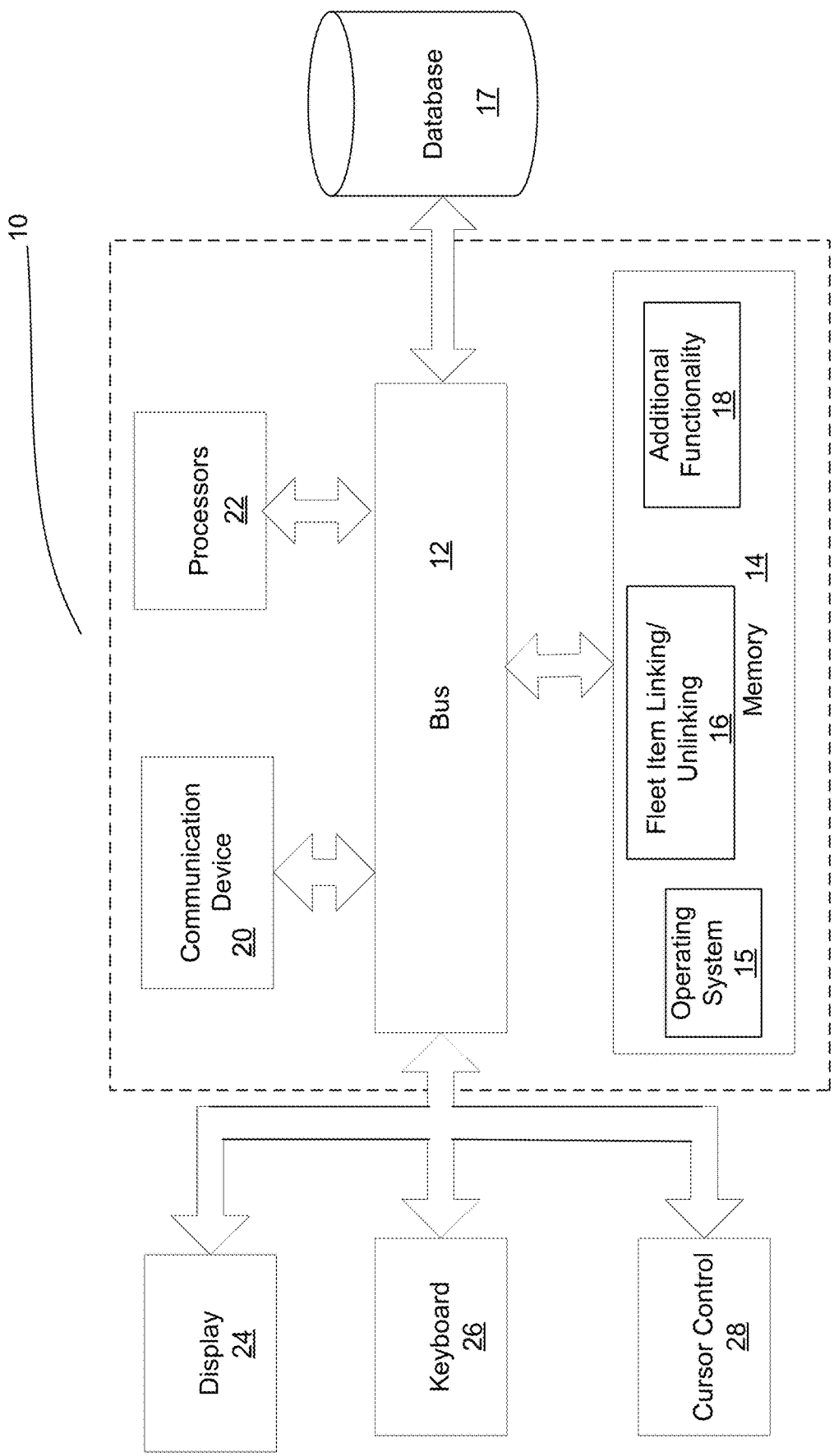
FIG. 2 is a block diagram of fleet item linking/unlinking of FIG. 1 in the form of a computer server/system in accordance with an embodiment of the present invention.

FIG. 2 is a block diagram of fleet item linking/unlinking 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a fleet item linking/unlinking module 16 that automatically links/unlinks sensors from inventory items at the appropriate time and place during a pre-planned trip, and all other functionality disclosed herein. System 10 can be part of a larger system. Therefore, system 10 can include one or more additional functional modules 18 to include the additional functionality, such as the "IoT Asset Monitoring Cloud Service" or "IoT Fleet Monitoring Cloud" from Oracle Corp. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ('IMDB'). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

In general, an IoT Fleet Monitoring system such as "IoT Fleet Monitoring Cloud" from Oracle Corp. monitors the inventory items that are being shipped, and the returnable transportation assets (trailers, containers, racks, pallets, etc.) that are used to execute the movement. The items or assets are picked up at a particular stop and dropped off at another during the course of trip. The location and condition of these inventory items or assets need to be monitored between these two stops, pickup and drop off, or generally during its life-cycle in the trip as per the pre-defined trip plan.

Known solutions manually link a sensor to an inventory during pick up and unlink the sensor during drop off. "Linking" and "unlinking" means the assigning and unassigning of a sensor to a business entity, as opposed to physically linking and unlinking. The business entities can include trips, shipments, vehicles, equipment in vehicles, ship-orders, ship-units or packages, ship-items, and the drivers assigned to a trip.

However, these known solutions may be error prone. Using known solutions, linking can be missed at a stop and hence the inventory does not get tracked at all. This could be a major problem when the items carried as part of the trip are expensive, fragile, and perishable. Using known solutions, an unlinking can be missed, which could lead to blocking a sensor from being used in another trip, when it is actually physically free for usage. An untimely unlinking can lead to lack of real-time visibility of an inventory item during the trip. In contrast, embodiments automatically link and unlink inventory items with sensors at appropriate times in the life-cycle of a trip adhering to the trip plan.

If a trip is planned using invalid or improper sensor information, known solutions may prevent the successful creation of such trips. At times, the sensor could be unknown or invalid; or even when the sensor is valid, it could be part of another trip during the same time period. Such problems may be common due to various parties and systems being involved in the process. Without automation in place, most systems do not have the flexibility to check for a sensor validity or availability just at the point of linking—because situations can change turning an unknown sensor to be on boarded just prior to the actual point of linking. Without automation in place, such plans for trips are unlikely to work and users will be forced to check all the sensor information and correct any faults for succeeding. For a trip with thousands of inventory items and hence thousands of sensors, this could become a serious operational hazard.

Known solutions generally do not allow for trip creation with validation errors because there are no issues raised when updating the inventories for a trip at a later stage. A typical industry solution would only allow for a trip update when the trip itself was created without any errors. If the incoming update payload has any validation error or any linking error, the solution would throw an exception and inform the user of the same. The user can then choose to correct the errors manually and retry the update operation.

However, it is desirable to not block trip creation due to an erroneous sensor linking plan and proceed further. In contrast to known solutions, embodiments resolve some of these errors during the runtime or guide the user to rectify the problem at appropriate junctures.

Figure 3:
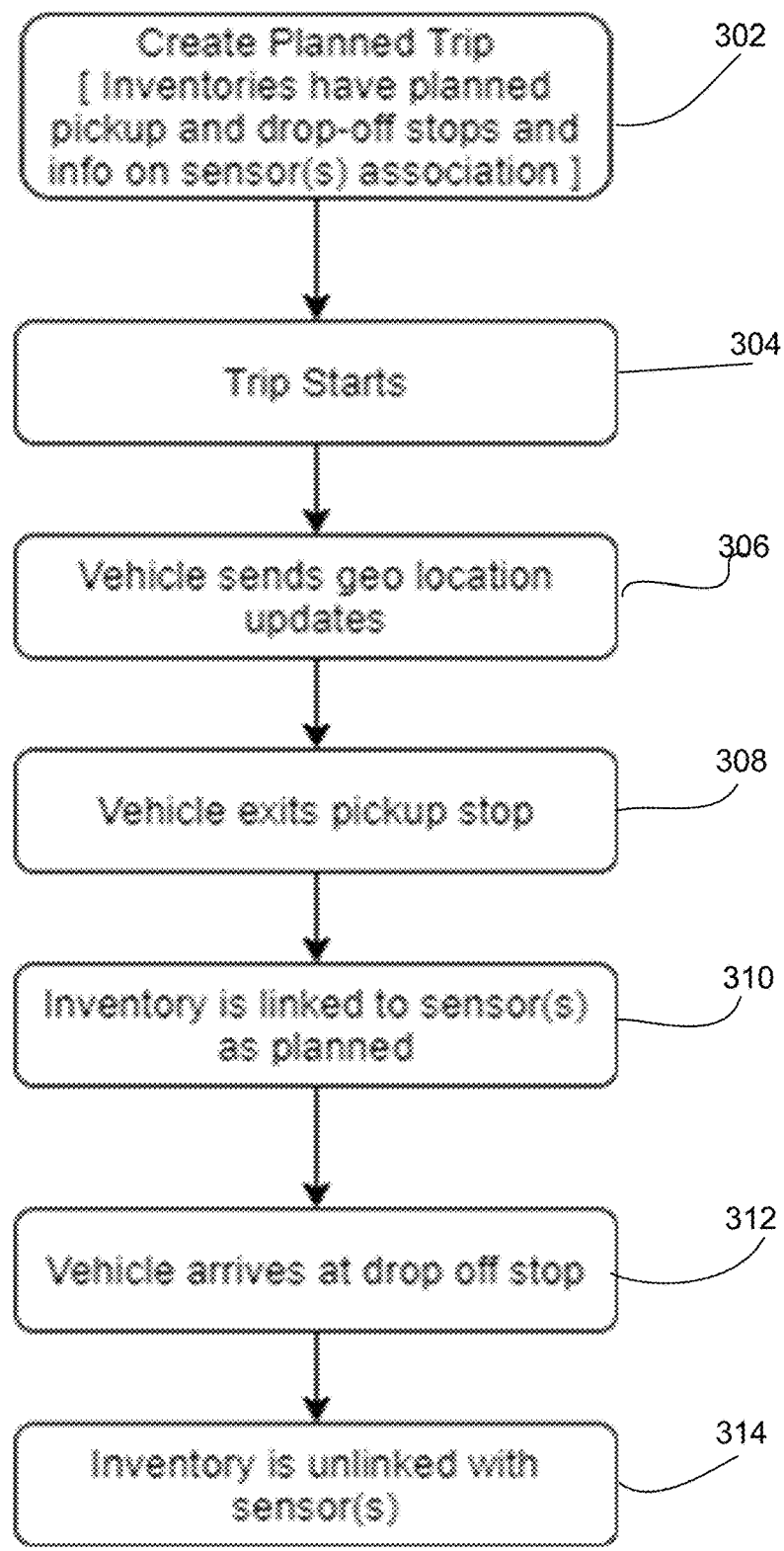
FIG. 3 is a flow diagram of the functionality of fleet item linking/unlinking of FIG. 1 when providing fleet item linking/unlinking functionality in accordance to embodiments of the invention.

FIG. 3 is a flow diagram of the functionality of fleet item linking/unlinking 10 of FIG. 1 when providing fleet item linking/unlinking functionality in accordance to embodiments. In one embodiment, the functionality of FIG. 3 (and FIGS. 5 and 6 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 302, a planned trip is created. The planned trip has specific pickup and drop off stops for specific inventory items. The planned trip also has a plan for sensor association with corresponding inventory items when and where applicable. Each stop has an address and hence a geo-position and a perimeter of a stop can be defined by a geo-fence (either radial or any other form). The trip plan can be created using a trip planning system, such as the trip planning system provided as part of the "IoT Fleet Monitoring Cloud" from Oracle Corp.

Embodiments include functionality that is included in a fleet monitoring system that monitors entities including trips, shipments, vehicles, equipment in vehicles, ship-orders, ship-units or packages, ship-items, and the drivers assigned to a trip. The "trip" is a collection of goods that is being transported, has been, or needs to be transported from one geographic location to another. The trip also encompasses the route defined for the movement of the goods.

Figure 4:
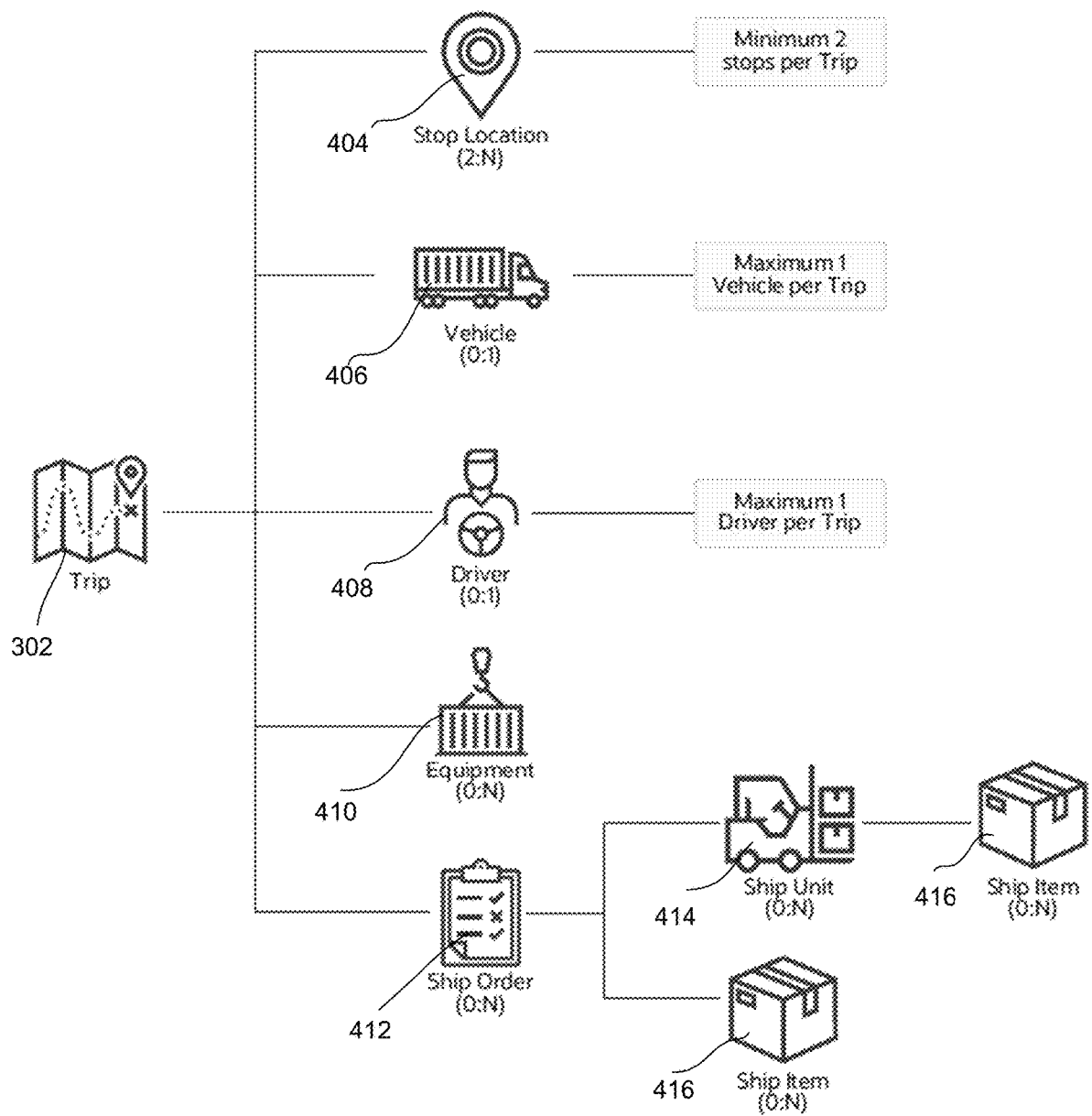
FIG. 4 illustrates the sub-entities that form a planned trip in accordance to embodiments of the invention.

FIG. 4 illustrates the sub-entities that form a planned trip 302 in accordance to embodiments. In addition to the start location and the final destination location, not shown, sub-entities include stop locations 404, which are the intermediate stops between the source and destination. They are either delivery points or pick up points. Sub-entities further includes a vehicle 406, which is a conveyance such as a truck or a car for transporting inventory from a source location to a stop location.

Sub-entities further includes a driver 408, which is the driver assigned to the trip. Sub-entities further includes equipment 410, which represents any method of storage or transport used for the movement of goods in a trip from one location to another, such as, a trailer, container, flatbed, or a tank, and so on. It can have sensors/trackers attached for measuring attributes including GPS, temperature, humidity, shock, tilt, pressure, and so on.

Sub-entities further include ship-orders 412, which are part of the inventory metadata that contains order information required for transportation of goods from one location to another in a trip. Sub-entities further includes ship-units 414 that are a transportation handling unit that is used to facilitate ease of transportation in a trip. These can be wooden or metallic pallets, boxes, cartons, automotive racks, and so on. A ship-order can contain one or more ship-units. Sub-entities further include ship-items 416 that are an individual trackable inventory item or items that is being transported and monitored in a trip. It can belong to a ship-unit 414 or can be independent of ship-units 424.

Each of the items and sub-items shown in FIG. 4 can be tracked using a corresponding sensor 101 (e.g., an IoT sensor) that transmits the location of the item, and other information if needed, at predetermined time intervals, in the form of messages. The messages are received by fleet item linking/unlinking 10.

Referring again to FIG. 3, after the planned trip is created at 302, with as many entities and sub-entities as needed, at 304 the trip starts. At 306, the vehicle sends geo location updates during the trip. In embodiments, real-time tracking of the trip is based on GPS telemetry data. Therefore, based on a trip's position and a stop's geo-fence, the arrival and departure at a stop can be determined.

At 308, the vehicle is detected as exiting a pickup stop. At 310, the inventory item is linked to sensors per the trip plan. For example, any inventory item that is scheduled to be picked up at the pickup stop is linked/assigned to a corresponding sensor so that the sensor can then be used to track the inventory item. The inventory item is linked to sensor by updating a database table to link the inventory and sensor.

This is automatically done by the system when the vehicle leaves the pickup stop. Embodiments further include a field on the inventory named "isLinked" which determines the status of linking. Whenever linking happens, this field is set to true and its value can be observed on the trip JSON as well as a user interface. It is assumed that the correct sensor has been physically coupled to the inventory item either directly or via a box or other mechanism that houses the inventory item.

Based on a trip's plan and its stop arrival/departure detection, the linking of the sensor to the trip's inventory is done automatically. As soon as embodiments detect the trip's geo-position crossing the stop's fence boundary, the planned linkage between an inventory and sensor(s) for that stop happens automatically at 310.

When linked, the sensor can send GPS telemetry data and other sensed attributes, such as temperature, humidity, pressure, that corresponds to the linked inventory item.

At 312, the vehicle arrives at a drop off stop, as determined by the trip plan. At 314, the inventory item is automatically unlinked/unassigned from the sensor. The unlinking occurs in embodiments by updating a database table to remove the previously added linking information. Unlinking of the sensor to the inventory also updates and sets the field "isLinked" on the inventory to false. Once the sensor(s) is (are) unlinked from the inventory items, the GPS and/or any other telemetry data do not get tracked for the trip or the inventory item that it was linked with because the sensor can now be linked to another asset and the data may not have any relevance, which can create unwanted anomalies. Post unlinking, the sensor(s) are available for linking to other inventory item(s) belonging to this trip or any other trip.

In embodiments, the primary source of a trip's geo-position is the vehicle that is associated with the trip. In the case of non-availability of GPS telemetry data from the vehicle, a trip can obtain geo-position data directly from the sensors associated to the trip. In embodiments, these sensors are directly linked to the trip and not by means of any inventory. In embodiments, the driver's mobile phone can act as the source of GPS telemetry for the trip, or any other source. Therefore, embodiments automatically link the sensors to the trip when the trip starts. If neither of the above are available as per plan, the sensors of those inventories that are planned to be picked at the source stop are linked when the trip starts. This ensures that the trip has a steady flow of geo-position data.

The automatic linking and unlinking of entities to sensors allows seamless tracking of trips and their inventory items.

Error Handling

Embodiments implement error handling for the sensor to trip inventory item linking/unlinking functionality of FIG. 3. Embodiments include error detection paths and ways to resolve them. For example, if an invalid sensor information is provided in the plan, the trip gets created with an error. Further, if a sensor mentioned in the plan is already in use for some other trip, a sensor busy error is marked. Embodiments auto resolve some of these issues in due course of the trip's life-cycle. It also guides human beings to fix the problem with minimal intervention.

Examples of validation errors detected by the embodiments includes: (1) The sensor specified in a trip plan is unknown to the IoT system; (2) The sensor specified in a trip plan is not in an appropriate state in the IoT system (not activated or decommissioned); (3) The trip plan may erroneously specify the same sensor multiple times in the list; (4) The trip plan may not consider usage of a sensor in another trip at the same time; or (5) The trip plan may specify a sensor that does not implement the appropriate set of attributes (e.g., the sensor may detect speed while the intention is to detect temperature and humidity).

Embodiments check for these errors. Embodiments either try to automatically resolve them, such as if there is a repetition of the same sensor multiple times then it can eliminate the duplicates, or it saves them on the trip for resolutions at a later stage. These validations do not lead to a failure in importing trips from a planning system to an IoT system (assuming separate systems). The errors detected will either get auto-resolved during the life-cycle of the trip or embodiments will guide users to rectify them.

Figure 5:
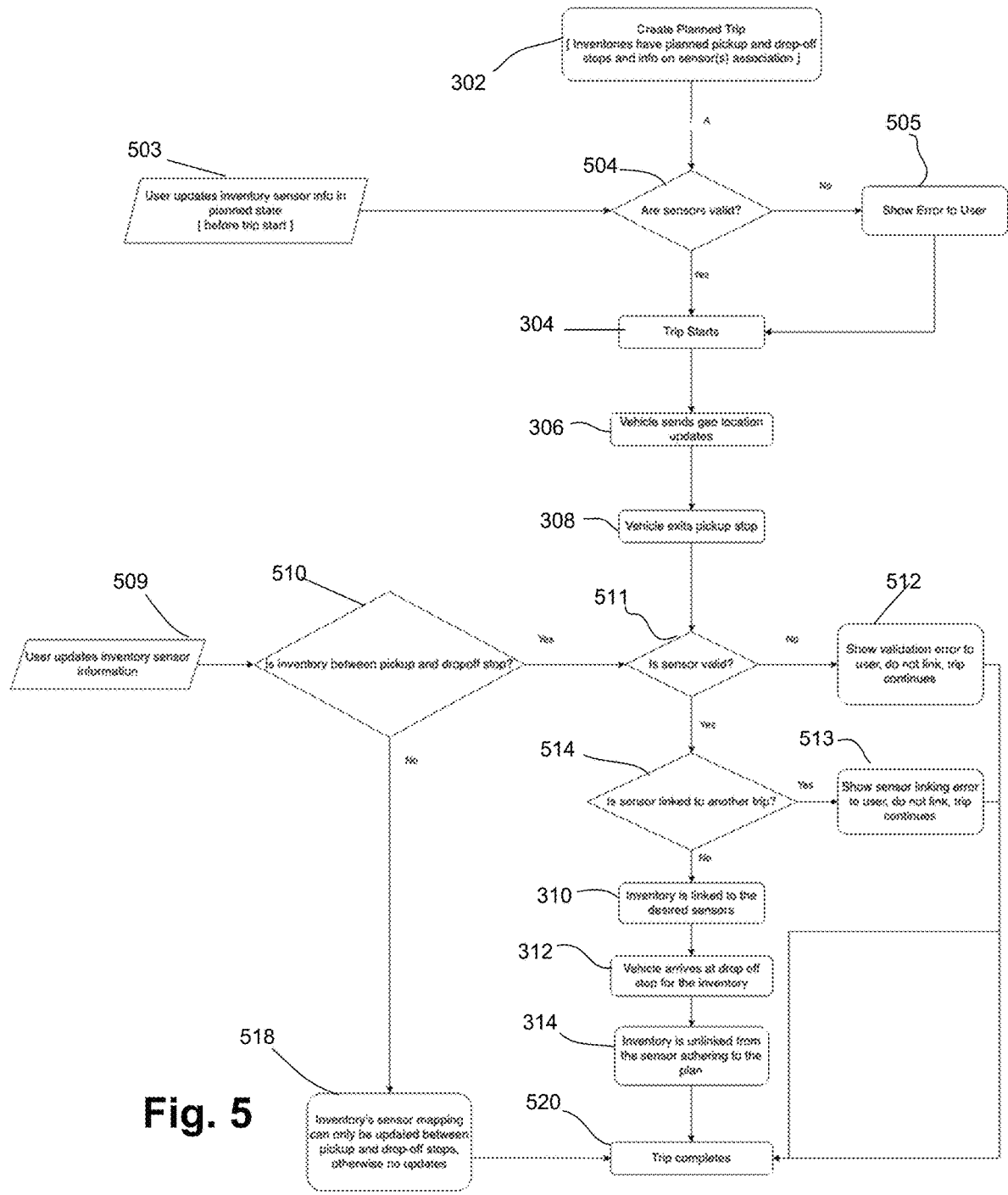
FIG. 5 is a flow diagram of the functionality of fleet item linking/unlinking of FIG. 1 when providing error handling for fleet item linking/unlinking functionality in accordance to embodiments of the invention.

FIG. 5 is a flow diagram of the functionality of fleet item linking/unlinking 10 of FIG. 1 when providing error handling for fleet item linking/unlinking functionality in accordance to embodiments.

At 302, a planned trip is created (same as 302 of FIG. 3). At 503, the user updates the inventory sensors information in planned state. The inventory sensor is identified by a device ID or device name or hardware ID. If a device corresponding to the device ID or name or hardware ID is not present in the system, the sensor is invalid. The user can update a valid device ID or name or hardware ID. At 504, it is determined if the sensors are valid. If no, an error is shown to the user at 505.

At 304, the trip starts, at 306 the vehicle sends geo-location updates, and at 308 the vehicle exits a pickup stop.

At 509, the user updates the inventory sensor information. The user can update a different device ID or name or hardware ID. At 510, it is determined if the inventory item is between a pickup and dropoff stop. If yes at 510, at 511 it is determined if the sensor is valid. If no, at 512 the validation error is shown to the user, the sensor is not linked to the inventory item, and the trip continues.

At 514, it is determined if the sensor is linked to another trip. If yes at 514, at 513 the linking error is shown to the user, the sensor is not linked to the inventory item, and the trip continues.

If no at 514, at 310 the inventory item is linked to the desired sensor. At 312, the vehicle arrives at the drop off stop for the inventory item. At 314, the inventory is unlinked from the sensor, adhering to the trip plan.

If no at 510, at 518 the inventory sensor mapping can only be updated between pickup and drop-off stops, so no updating (i.e., linking or unlinking) occurs. The inventory sensor mapping can be updated up to the time the inventory is dropped off. Inventory is dropped off when the vehicle enters the drop off spot, so updates can occur between the stops. At 520, the trip is completed.

In embodiments, there two types of errors that can happen when an attempt is made to link a sensor to a trip or its inventory item: (1) Validation errors at creation, which happen due to invalid sensor information used in the plan, unknown sensors, an invalid state, etc.; and (2) Validation error at linking, which happen when a sensor is found linked with an active trip and hence is marked busy.

In embodiments, for a sensor to be successfully linked to a trip's inventory item: (1) There should be no sensor validation errors at creation; and (2) The trip must reach the stop where the inventory item is supposed to be picked up.

If the above conditions are true, then embodiments try to link the sensor to the inventory item automatically. At this point, if the sensor is busy in another trip, a validation error is reported. Otherwise the automatic linking succeeds.

Trip Update

In embodiments, after the creation of the trip plan at 302, updates to it are allowed with some restrictions. Updates are allowed to fix sensor planning errors. After such updates, embodiments re-evaluate the sensor linking/unlinking plan. When a trip is in a planned state, updates are less restrictive. In embodiments, the updates allowed include: (1) Adding or removing inventory items for a trip; (2) Updating sensor link/unlink information with trip inventories; and (3) Updating the list of sensors to be directly linked to the trip.

When the trip is in progress and an inventory item has already been picked up as per the trip plan but has not been dropped yet, embodiments still allow updates of the sensor association information with the inventory item.

During the above updates, embodiments automatically determine whether any update is permissible on the inventory item based on its life span in the trip's life-cycle. Embodiments have built-in intelligence to reject any erroneous or improper updates.

Dynamic Hierarchical Digital Twin

A "digital twin", in general, is the digital representation of a physical asset, or even a static hierarchy of associated sub-assets. For example, consider a digital twin representation of a vehicle that contains wheels, engine, driver cabin, etc. The vehicle digital twin is a representation of a physical entity with static associations of its sub-components.

In embodiments, a "dynamic hierarchical" digital twin not only captures the details of the main entity but also the association between its associated entities that are transient or dynamic in nature. In connection with a trip plan, such as created at 302 above, there are multiple levels of entities that are used and all of them are trackable (i.e., they can have IoT sensors attached to them while the trip is underway). These entities include transport equipment (e.g., trailers or containers), transport packages (e.g., pallets, racks, totes, bins, etc.) and inventory items.

In embodiments, the digital twin can also represent dynamic entity associations such as a trailer that is only associated with a trip for the planned duration. Outside of a trip, the trailer entity object gets monitored like a standalone asset. Therefore, this digital twin is both generic as well as dynamic. It is generic because the digital twin user interface ("UI") component can display any entity, including the vehicle, transport equipment, transport packages and inventory items. It is dynamic because it adapts to dynamic associations that occur during a trip lifecycle based on the transportation plan and correlates IoT data from the associated entities accordingly.

A trip can have multiple such dynamic associations given there are inventory items that need to be picked up and dropped off at different stops or even the returnable transportation assets (equipment, package, etc.) that are required to facilitate this movement. The inventory item or transportation asset gets linked automatically to sensor(s) based on GPS telemetry data and the IoT data starts getting correlated. As for the relation between these associated entities, there is a movement hierarchy which is followed as equipment contains the packages and the package contain the inventory items during the trip execution cycle.

As disclosed, IoT sensors can be used to monitor inventory, including the condition of their inventory items at all times while they are in-transit. When the trip plan gets created at 302, there may be one or multiple items packed in a single package, to facilitate loading/unloading at locations. Further, multiple such packages may get loaded on a single container for streamlined movement. As a result, a dynamic hierarchical relation for the association duration and each trip segment is formed, and it can change with every trip and may even also change at a stop location within a trip. With fleet management in accordance to embodiments, there are sensors attached to either or all of these entities and IoT applications allow the monitoring of each of these entities via the sensors attached at multiple levels.

With known solutions, most of the digital twins could only provide the individual entity level digital twin or at most a static hierarchical association that is well defined. In such solutions, if a trip is planned using multiple entities and all are equipped with IoT sensors, a typical industry solution would be to navigate to its standalone digital twin and view it independently. Further, with known solutions there is generally no option to correlate the associated entities data for better understanding. At times the sensor information is best viewed or analyzed when correlated, given if a package is carrying an item, it is best to monitor it in tandem for any condition excursions leading to damage or spoilage. Without dynamic hierarchical digital twin in place, most systems do not have the flexibility to check for a sensor data correlation between an entity and its associated entity—because dynamic hierarchical digital twins provide an option to monitor the real-time situation in accordance with the entity it is carrying or associated with at that point of time. Further, for a trip with multiple levels of entity associations (e.g., Equipment>>Package & Package>>Inventory Items) and multiple layers of sensor data correlations, it could become a cumbersome task to monitor all of these in isolation.

In contrast, in addition to providing an option for sensor data correlation for dynamically and time-bound associated entities, embodiments support the erroneous situation identification, where if the planned association is not established and required linking is not established and data correlated, that corresponding digital twin view would render "Null" views and a visual indicator for not-linked entities, which can be further analysed for missed pick-ups at origin or incorrect deliveries at intermediate stops.

In order to form a dynamic hierarchical digital twin (as opposed to known generic or static hierarchical digital twins), embodiments define the digital twin information in a JavaScript Object Notation ("JSON") format. The JSON format defines the main entity, the main or parent entity's attributes, the associated or the contained entities and their attributes. Embodiments implement the JSON format as a specialized novel data structure that can be sent to specialized systems and stored in database tables. The following is example JSON for defining a ship item 416:

```
{
  "id": "2X3Q1CQK5JJ6",
  "organizationId": "2WRMWPWZ5JJ0",
  "tripid": "2X3Q1CQK5JJ0",
  "shipOrderNumber": "SO2 301 86598",
  "shipUnitNumber": "SU1 201 86598",
  "shipItemNumber": "SI1 201 86598",
  "shipItemKey": "SI1 201 Ref 86598",
  "commodity": "Computer Motherboard : Fragile",
  "isHazardous": false,
  "weight": {
    "unitOfMeasure": "kg",
    "value": 8.9
  },
  "quantity": 200,
  "volume": {
    "unitOfMeasure": "m3",
    "value": 6.7
  },
  "specialInstruction": "Electronic Parts : Circuit Boards : Fragile",
  "tripEquipmentRef": "EQ1 FB Trailer 101 86598",
```

-continued

```
"trackers": [{
    "deviceEndpointName": "Fragile Sensor 203 VC",
    "value": "2WRPC8YV5JJ0",
    "key": "IoTDeviceID",
    "deviceEndpointId": "2WRPC8YV5JJ0"
}],
"IdBasedPaths":
["/2WRMWPWZ5JJ0/2X3Q1CQK5JJ0/2X3Q1CQK5JJ9/
2X3Q1CQK5JJ3/2X3Q1CQK5JJ6"],
    "nameBasedPaths": ["/Vision Corp/Fragile_B.2.14T12.44.50/
EQ1 FB Trailer 101 86598/SU1 201 86598/SI1 201 86598"],
    "typeBasedPaths": ["/ORG/TRIP/EQUIPMENT/
SHIP_UNIT/SHIP_ITEM"],
    "assetOrTrackerSource": "WEB_UI",
    "dropStopSequence": 5,
    "IsDetached": false,
    "isLinked": false,
    "pickupStopSequence": 1,
    "volumeInCBM": 6.7,
    "weightInKG": 8.9,
    "openIncidents": 0,
    "alerts": 0,
    "errors": [ ],
    "entityType": "SHIPITEM",
    "attributes": [{
    "id": "2WRMZT36MP20",
        "name": "temperature",
        "type": "SENSOR",
        "primaryKey": false,
        "optional": false,
        "dataType": "NUMBER",
        "value": {
            "device": "real",
            "type": "SENSOR",
            "entityId": "2X3Q1CQK5JJ6",
            "sensorId": "2WRMZT36MP20",
            "dataType": "NUMBER",
            "attributeName": "temperature"
        },
        "entityId": "2X3Q1CQK5JJ6",
        "orgId": "2WRMWPWZ5JJ0",
        "sensorId": "2WRMZT36MP20"
}, {
    "id": "2WRMZT2PMP20",
    "name": "shock",
    "type": "SENSOR",
    ...
}, {
    "id": "2WRMZT3YMP20",
    "name": "humidity",
    "type": "SENSOR",
    ...
}, {
    "id": "2WRMZT3JMP20",
    "name": "tamperDetection",
    "type": "SENSOR",
    ...
}, {
    "id": "2WRMZT4TMP20",
    "name": "tilt",
    "type": "SENSOR",
    ...
}, {
    "id": "2WRMZT6YMP20",
    "name": "ambientTemperature",
    "type": "SENSOR",
    ...
}, {
    "id": "2WRMZT22MP20",
    "name": "light",
    "type": "SENSOR",
    ...
}, {
    "id": "2WRMZT4AMP20",
    "name": "pressure",
    "type": "SENSOR",
    ...
}],
"imageClass": "icon-shipment-item",
"associatedEntities": [ ]
}
```

When a trip is created with, for example, a vehicle, driver, trailer which in-turn contains transport packages (e.g., pallets, racks, totes, bins, etc.) and inventory items, the individual digital twins of all the entities are implemented with JSON. For example, the vehicle digital twin's JSON will include its name, attributes such as speed, odometer, engine rpm, etc. The trailer digital twin's JSON will include its name, attributes such as humidity and pressure, and may also include associated entities such as pallets and inventory items with their names and attributes.

Before the trip is started, the digital twin captures the static and hierarchical information. In the case of a trailer digital twin, before the trip is started, the digital twin captures the trailer's list of attributes and its associated pallets or inventory Items and their attributes. These main attributes or associated attributes will primarily be the planned information. When the trip starts and the IoT sensor on the trailer is linked to the trip, the trailer digital twin starts correlating the data and formation of the dynamic hierarchy between contained entities, such as Trailer>>Packages>>Inventory Items.

In embodiments, the digital twin implements a planned transportation information stream along with the dynamic IoT data correlation which follows the automatic inventory linking and unlinking algorithm disclosed above and enables this dynamic hierarchical digital twin formation.

Further, in embodiments the trailer digital twin may include pallets and inventory Items that are picked up and dropped off at different stops. Therefore, the linking happens only when a particular pallet or item is picked up at its designated stop and only then embodiments receive sensor data information. Therefore, the trailer digital twin UI's associated entities will display data only for entities that are currently linked. This allows for clear representation of the trip's progress and inventory associations and dissociations.

As an example of the dynamic hierarchical digital twins in accordance to embodiments, assume the trip plan includes following transportation entities:

Vehicle Name—Box Truck A, Power Unit X . . .

Equipment—Standard Dry Trailer . . .

Packages—Metallic Pallet X, Metallic Pallet Y . . .

Inventory Item—Part P, Part Q, Part R . . .

The trip plan at 302 will define planned details such as:

Trip #123 includes Power Unit X along with Standard Dry Trailer and Metallic Pallet X carrying Part P and Part Q When Trip #123 starts, the IoT sensors on Standard Dry Trailer and Metallic Pallet X and Part P and Part Q starts getting correlated and a dynamic hierarchical digital twin gets formed between these entities.

In embodiments, once Trip #123 gets completed or the planned unlinking of entities has happened, another Trip #124 or so can re-use these dynamic entities and form similar or different such hierarchies, such as:

Standard Dry trailer>>Metallic Pallet Y>>Part R
Standard Dry trailer>>Metallic Pallet X>>Part P and Part R
And so on . . . .

There is no limit on the number of possible such relations or correlations that can form and the dynamic hierarchies between such transportation entities continues and the IoT data correlation is all dependent on automatic linking and unlinking of inventories.

Figure 6:
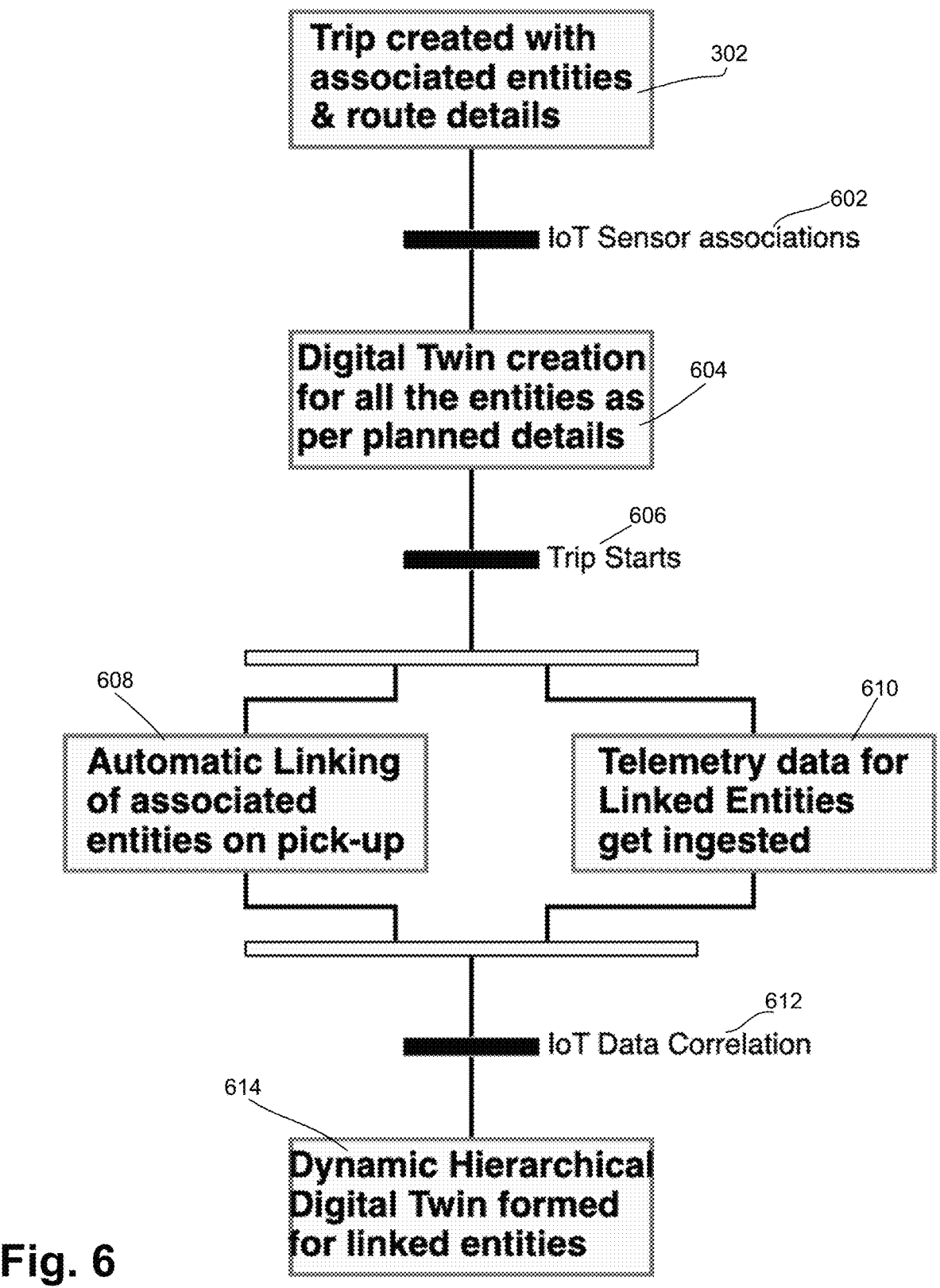
FIG. 6 is a flow diagram of the functionality of fleet item linking/unlinking of FIG. 1 when providing error handling for fleet item linking/unlinking functionality in accordance to embodiments of the invention.

FIG. 6 is a flow diagram of the functionality of fleet item linking/unlinking 10 of FIG. 1 when providing error handling for fleet item linking/unlinking functionality in accordance to embodiments.

At 302, the trip plan is created with associated entities and route details. The trip plan includes IoT sensor associations with the entities at 602.

At 604, a digital twin is created for all entities as per the details of the plan at 302. At 606, the trip starts.

At 608, as disclosed above in conjunction with FIG. 3, upon pickup, embodiments automatically link the entities to the sensors. At 610, the telemetry data for linked entities gets ingested.

At 612, IoT data is correlated. At 614, the dynamic hierarchical digital twin is formed for all linked entities.

Embodiments create a digital replica of the physical assets and help customers monitor different aspects of that physical asset and give an option to take actions as required. Embodiments create a contained dynamic hierarchical view for better insights and ease of monitoring.

Embodiments include the ability to create a planned inventory hierarchy and enable linking and unlinking of IoT sensors automatically. The solution is agnostic of any specific hardware requirement. All it requires is a GPS and/or condition telemetry data from the sensors and a planned transportation details—route, stops, equipment, packages and inventory items. On successful linking of IoT sensors, embodiments correlate the data to individual entities and create a dynamic hierarchical digital twin for prolonged and tandem monitoring.

Once all the key planned information is collated and the trip commences, the real-time tracking of trip based on GPS telemetry data starts. On stop detection, the automated linking gets triggered to fetch all the inventory items being picked up at the stop and thereafter the IoT data correlation assimilates all the required data to enable the digital twin formation.

The equipment digital twin displays the telemetry information based on the sensor attached to the equipment. In addition, it also includes the telemetry data from all the packages that are contained within that equipment and shows a contained hierarchy only for the packages that got picked up at that stop.

Similarly, all the inventory items that got picked up and contained in the package forms another hierarchical digital twin and enables the tandem monitoring for package and inventory item. Further, when a trip's arrival at the stop of planned drop off of the inventory is detected based on the trip's plan information, the sensor(s) get automatically unlinked from the inventory item.

At that moment, the GPS and/or any other telemetry data does not get tracked for the trip or the inventory item that it was linked with. Post that, the dynamic hierarchical digital twin retains the last known values and ceases the IoT data correlation for that trip. The same equipment, package or even the inventory item can then be further re-used on another/subsequent Trip and a similar digital twin formation gets enabled on the new trips.

The dynamic hierarchical digital twin of transportation entities via sensors allows seamless tracking of trips and their contained inventory items.

Embodiments further include control on the exception situations that can occur while the trip is In-transit. Exceptions can be related to missed pick-ups at the origin or other pick-up locations. For example, a plan can dictate 10 packages or items to get picked up and when the truck departs the location, only 9 out of those 10 packages are rendering telemetry data and get linked to the trip. In such situations, the digital twin can render a visual indicator to highlight the missing package.

Exceptions can be related to an incorrect delivery at an intermediate stop location. Similar to the missed pick-up scenario, if a package is accidentally left over or dropped at a wrong stop, the linkage to the trip would be set to "False" and would be a deviation from the planned movement details. Embodiments would render a visual indicator to highlight that package while being on the equipment digital twin view.

This hierarchical correlation created dynamically, used when the IoT data streams in, makes the monitoring of transportation entities and associated inventory items seamless and at the same time renders visual indicators for better monitoring.

In embodiments, the planned information can get updated based on business needs or availability of transportation assets and/or inventory items and so when the plan details change the dynamic digital twin also gets updated and accommodates the new information for IoT data correlation for appropriate visibility. The plan updates can be related to: (1) Adding or removing inventory items for a trip; (2) Updating sensor(s) link/unlink information with trip inventories; (3) Updating the list of sensors to be directly linked to the trip; or (4) Modifying the equipment or package details for the trip.

In case of modifications while in-transit and something gets changed, the digital twin accommodates those updates and provides the appropriate information related to the associations of entities while on the move.

Figure 7:
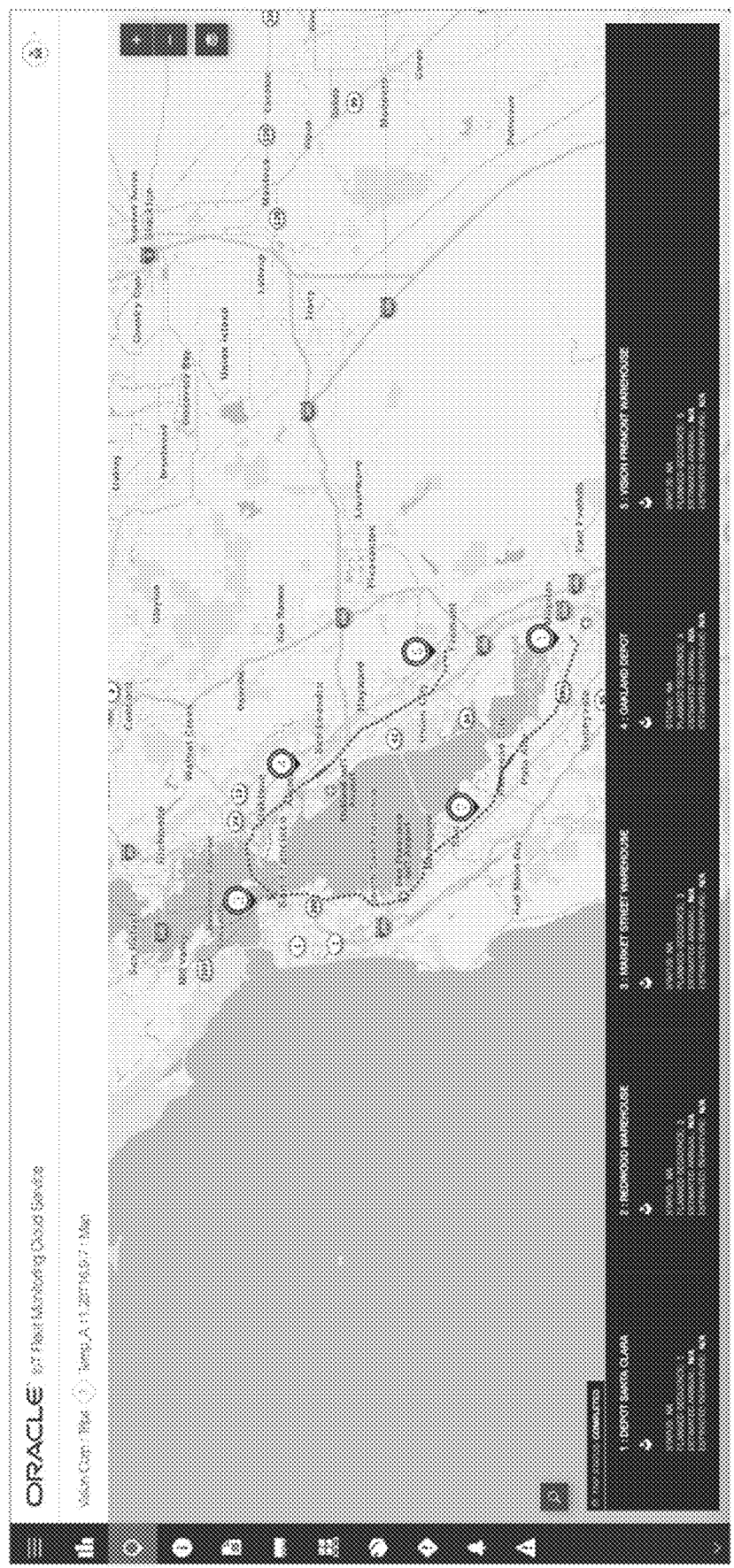
FIG. 7 illustrates a UI showing a planned trip in accordance to embodiments of the invention.

FIG. 7 illustrates a UI showing a planned trip such as created at 302 in accordance to embodiments. The trip indicates a sequence of 5 stops (numbered 1-5). The trip of FIG. 7 includes trip equipment (a flatbed trailer), shipping units (3 metallic pallets), and each shipping unit has a ship item (MMR vaccine, Insulin, and Aerosol Spray)

Figure 8:
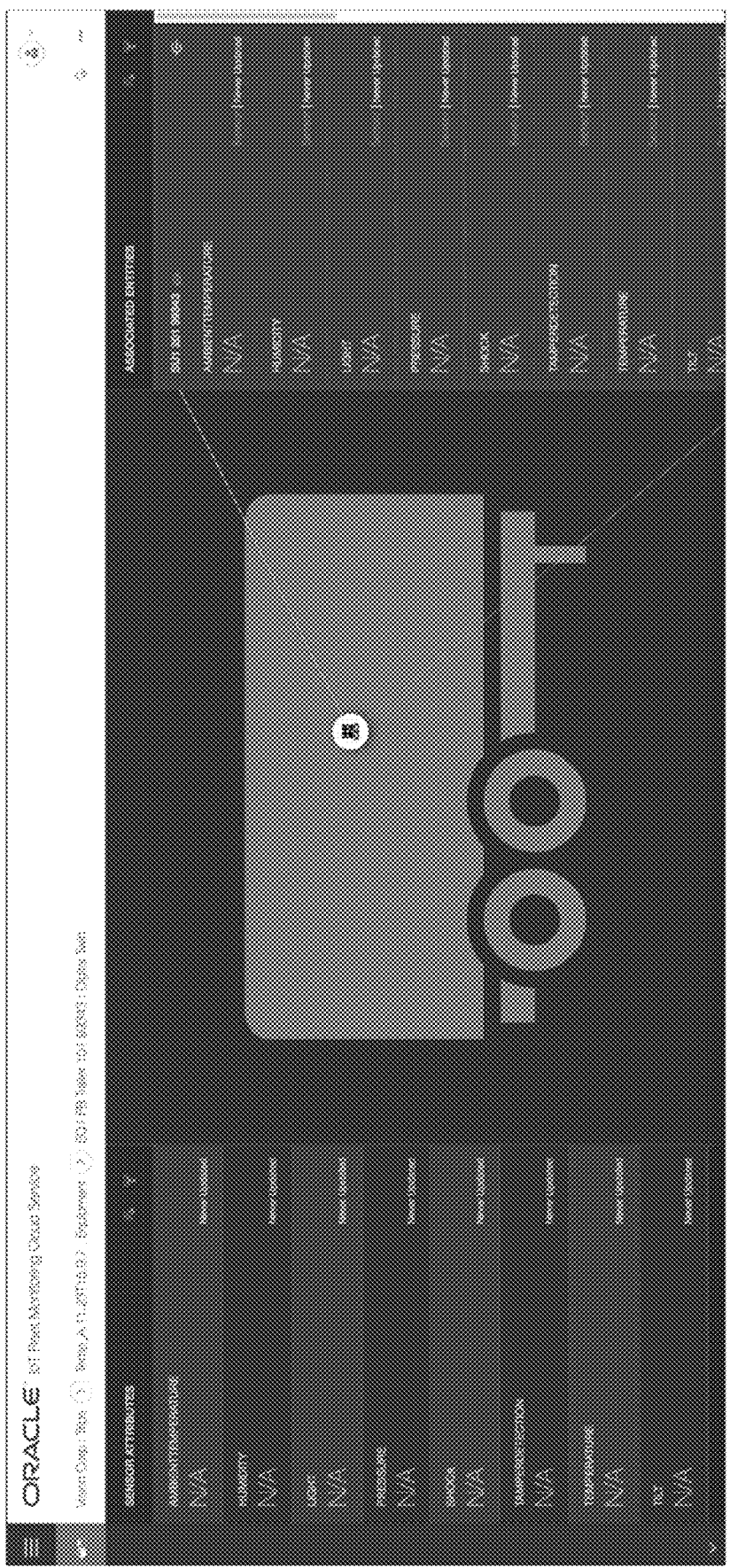
FIG. 8 illustrates a hierarchical equipment digital twin showing associated ship units in accordance to embodiments of the invention.

FIG. 8 illustrates a hierarchical equipment digital twin showing associated ship units in accordance to embodiments.

Figure 9:
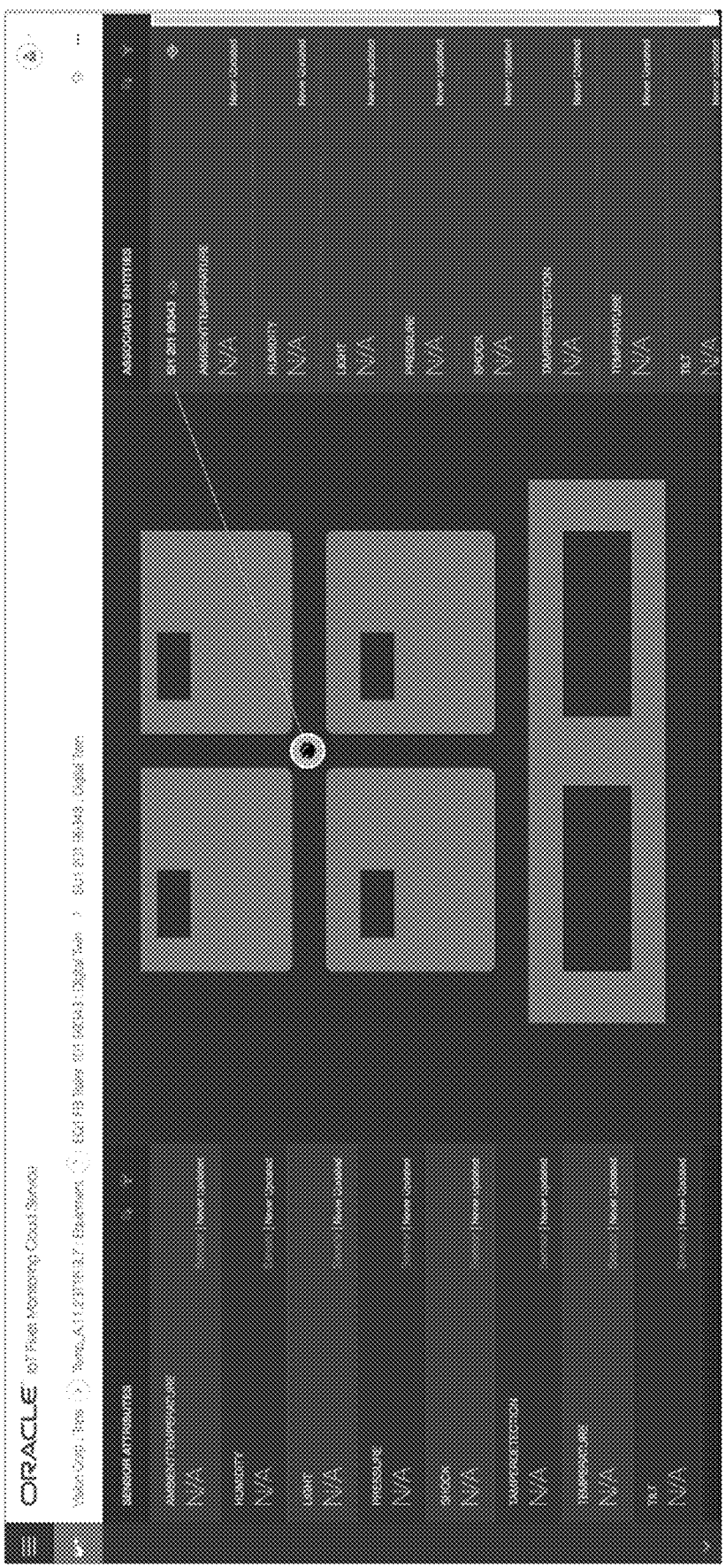
FIG. 9 illustrates a hierarchical shipping unit digital twin showing an associated ship item in accordance to embodiments of the invention.

FIG. 9 illustrates a hierarchical shipping unit digital twin showing associated ship item in accordance to embodiments.

Figure 10:
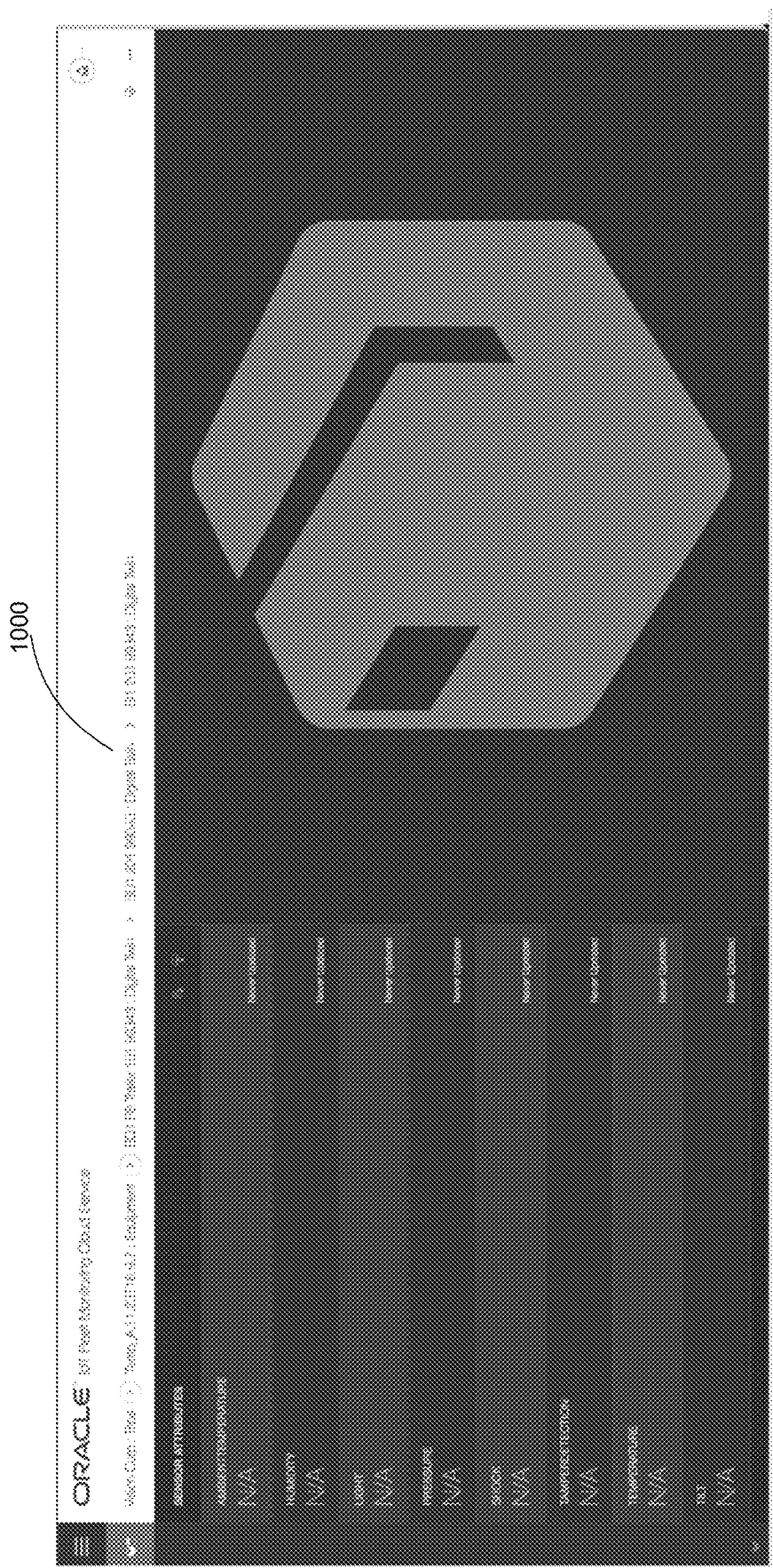
FIG. 10 illustrates a hierarchical shipping item digital twin with no associations in accordance to embodiments of the invention.

FIG. 10 illustrates a hierarchical shipping item digital twin with no associations in accordance to embodiments. Note the bread crump progression from equipment to ship unit to ship item at 1000.

After the trip begins, the following figures illustrate the dynamic hierarchical digital twins.

Figure 11:
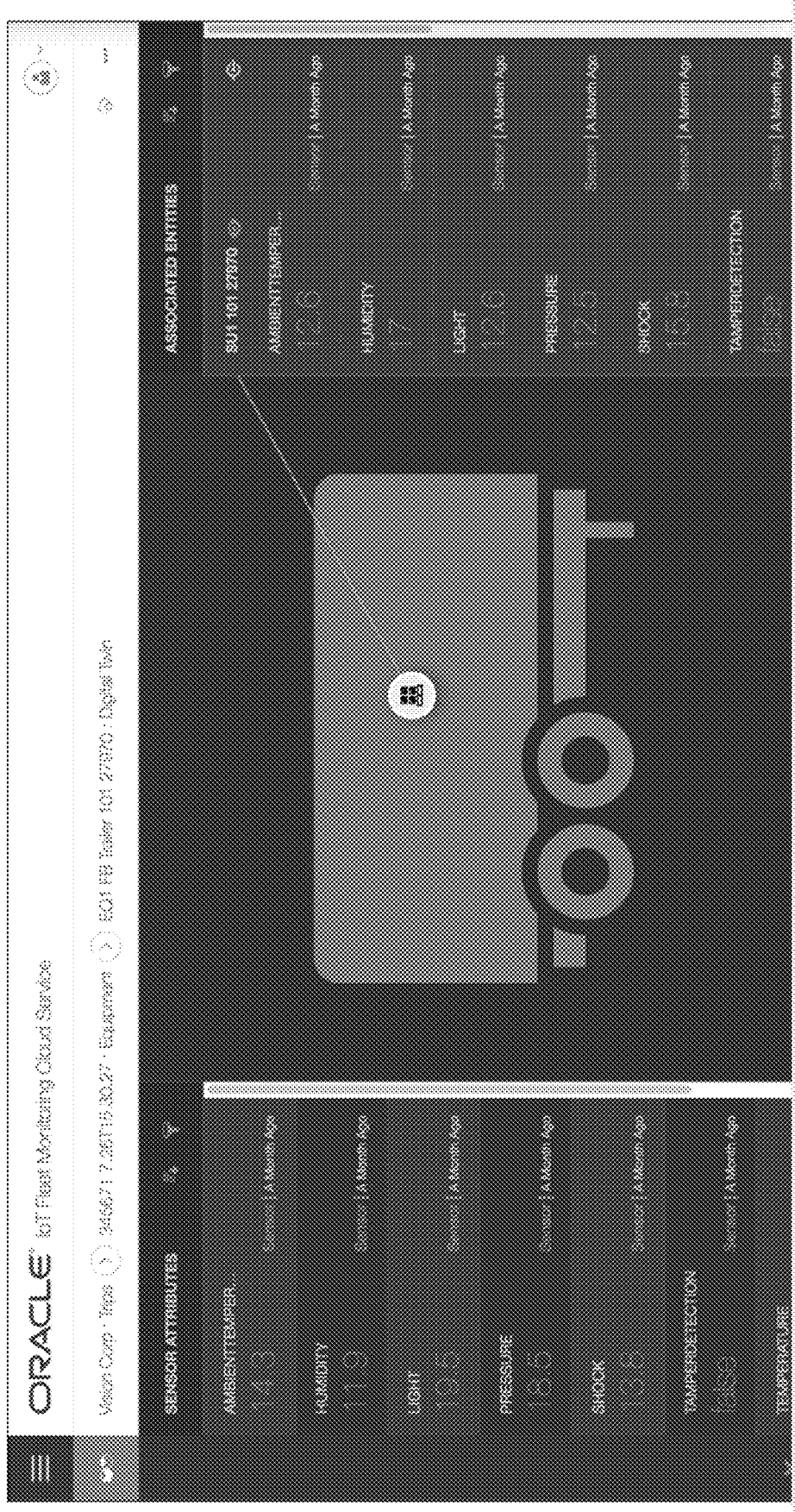
FIG. 11 illustrates the sensor data displayed for the main equipment entity and the ship unit associated entity in accordance to embodiments of the invention.

FIG. 11 illustrates the sensor data displayed for the main equipment entity and the ship unit associated entity in accordance to embodiments.

Figure 12:
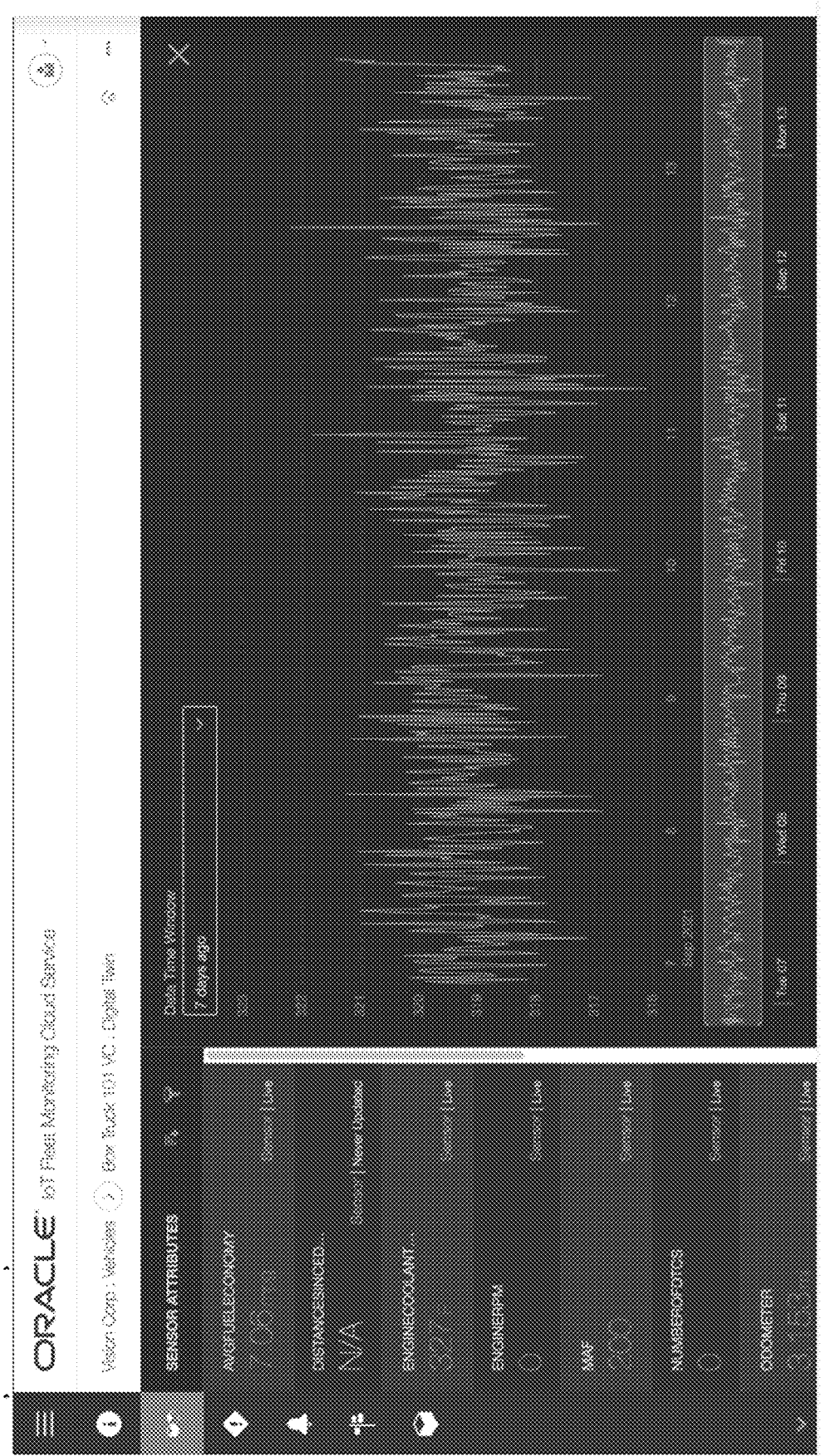
FIG. 12 illustrates a graphical representation of the equipment entity in accordance to embodiments of the invention.

FIG. 12 illustrates a graphical representation of the equipment entity in accordance to embodiments.

Sensor Gateway

In embodiments where there are a large number of IoT sensors 101, and/or some sensors are used for fleet monitoring as disclosed above, while other sensors are used for other types of functionality, a gateway between the sensors and the cloud (which can include fleet item linking/unlinking 10) is implemented. Examples of other types of functionality for sensors 101 include measurement of temperature, humidity, $CO_2$ levels, GPS, water level, water presence, electrical current/voltage, light, presence, etc. Small sensors or legacy devices can directly transmit their data to a nearby gateway instead of to the cloud, reducing their power consumption and increasing the sensors' battery life.

The gateway communicates with different types of sensors/devices using different protocols and then sends the data to a cloud service using a standard protocol. The gateway acts as a filter for the huge amount of data sent by the devices, processing the data and sending only relevant information to the cloud. Therefore, the processing and storage services is utilized optimally so that the need for processing and storage is reduced. Further, the response time for the sensors is considerably reduced. The nearby gateway receives the sensor data, processes it, and sends relevant commands back to the sensors. Further, gateways are highly secure and they also help secure the sensors and devices that are connected to them.

Figure 13:
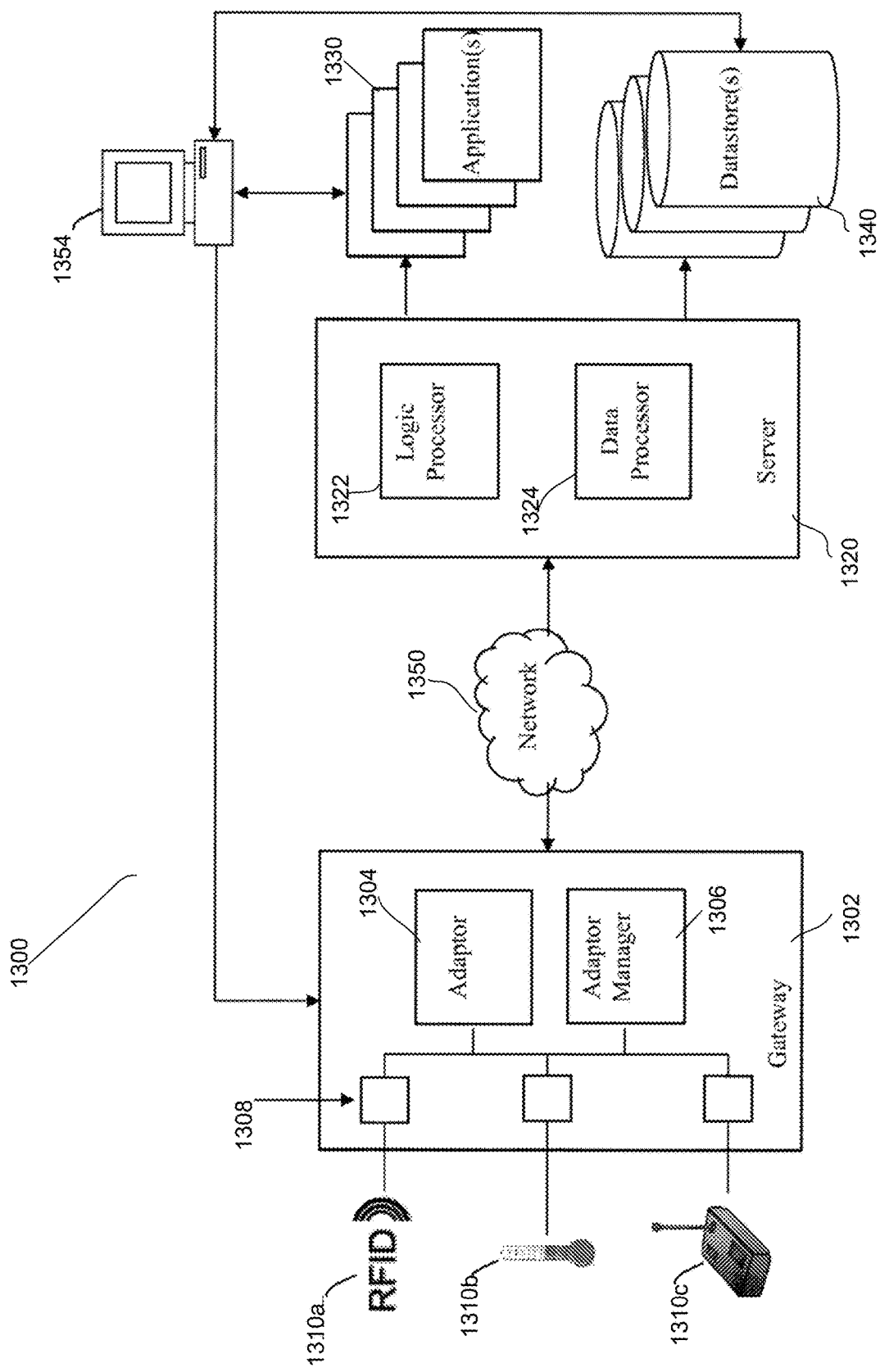
FIG. 13 is a block diagram of a gateway architecture in accordance to embodiments of the invention.

FIG. 13 is a block diagram of a gateway architecture 1300 in accordance to embodiments of the invention. Architecture 1300 permits effective integration between the systems in the operations technology portion and the systems in the information technology portion of the environment. Architecture 1300 generally includes a gateway portion 1302 having front-end data collection logic, and a server portion 1320 to perform back-end processing of the collected data. To handle many different device/sensor types (including IoT sensors 101) and to provide the ability to handle high numbers of units being deployed in the field, embodiments provide a robust platform for handling issues such as: (a) sensor definition; (b) sensor management; (c) data capture; (d) data processing; (e) data transfer; (f) data storage; (g) analysis; and/or (h) visualizations. This architecture provides a framework for interfacing with any type of local device that may be deployed at a client site, and to allow data captured from those devices to be sent to a remote server, and to have the collected data be both locally and remotely programmatically processed.

Gateway 1302 includes a sensor management module that handles the sensor code (e.g., that is implemented as custom code, such as Java code, specific to each sensor hardware). This module captures the sensor data in a generic way so that any type of data can be used. The gateway locally caches data so it can be pre-processed locally and no data is lost when there is no network connectivity. The data preprocessor performs actions such as data filtering using a set of rules. The system throttles the data so that data rates do not overwhelm the capabilities of the client gateway or the network. An internal data store may be included to store data in a platform-agnostic way. A data transfer module is employed to build the data for transmission. The system permits client gateways to talk to each other so as to establish a mesh network ensuring resiliency and connectedness.

In general, gateway 1302 performs data acquisition and management of local devices 1310a-c. The local devices 1310a-c may include any type of equipment that can be suitably managed by architecture 1300. For example, any number of sensors may be embedded within the local equipment at various sites. Examples of such sensors include RFID sensors at device 1310a, temperature sensors at device 1310b, and other types of smart devices, beacons, and/or machines at device 1310c (including IoT sensors 101).

Local devices 1310a-c can be configured to send data at regular intervals to gateway 1302. Such data may include information to be captured from the local devices. For example, information that may be captured include operating conditions, metrics, pressure, vibration, temperature, and/or flow rate.

In additional to using sensor data for fleet management, as disclosed above, other examples of the uses for sensor data may include: (a) handling perishable goods, where the system continuously monitors the temperature, humidity and location of goods as they travel through the supply chain, where by monitoring these critical factors and taking quick action on alerts, one can significantly reduce the spoiled goods and as a result increase revenue; (b) managing heavy machinery, by tracking the locations of a company's equipment along with environment conditions and operating metrics of the equipment, thereby ensuring that the equipment is being operated properly, preventing machine failures, and ensuring that the equipment is being properly used to the organization's goods and services; and (c) providing product support, where products that are sold could communicate back to the maintenance organization with current status, diagnostic information, and available quantity of consumables, and where the provided information helps to deliver a better quality of service to customers by discovering potential failures before they impact the customer and also increase revenue through expanded service offerings and replenishment of consumables.

Gateway 1302 includes an adaptor component 1304 and an adaptor manager 1306. Adaptor component 1304 (also referred to herein as an "IoT adaptor") manages the gateway's interaction with local devices 1310a-c, and may include device-specific code components 1308 to perform its processing with local devices 1310a-c. Adapter manager 1306 (also referred to herein as an "IoT adaptor manager") is used to manage the operations, versioning, and/or provisioning of local devices 1310a-c and adaptor component 1304. In some embodiments, gateway 1302 processes incoming data with local analytics (e.g., to analyze operating conditions and to identify fluctuations). To the extent necessary, alerts and data readings can be sent in real-time.

The data collected by gateway 1302 are sent over a network 1350 to server 1320. Server 1320 efficiently receives data from potentially a multitude of client gateways. The server module parses the data and caches it locally to expedite data capture. Pre-processing of the data may be performed for filtering, applying simple or complex script-based rules, etc. The data may be stored in an internal database. The persisted data can be forwarded to a corporate, generic table store. The server module may also take action based on the result of rules applied on the data, such as calling a web service, invoking further more complex rules, sending control data back to devices, etc. A generic table format can be used to store the sensor data within the enterprise application ecosystem. Keeping the relevant data within the ecosystem allows the use of standard tools in the enterprise application, such as reporting tools and form design tools. This means that users can use their pre-existing tools and systems to process the data from the operations technology ("OT") side, which allows the user to use systems which they are well-versed in using to report on and add intelligence to the data that is captured. An open interface (e.g., a RESTful interface) enables the captured data to be enquired and allows the development of rich, responsive, up-to-date client interfaces.

At server 1320, a logic processor 1322 (also referred to herein as an "IoT logic processor") and a data processor 1324 (also referred to herein as an "IoT data processor") are provided to implement analysis and alert processing. These components may include operations technology and industry-specific rules and scripts.

Server 1320 may communicate with one or more applications 1330. Such applications 1330 may include, for example, functionality to implement inventory management, quality management, condition-based maintenance, and/or provide a visualization portal, as well as functionality of FIG. 3 for determining inventory item linking and unlinking. Examples of these applications include, for example, Emergency Shutdown ("ESD") systems, Supervisor Control and Data Acquisition ("SCADA") systems, data analytics tools, BI ("business intelligence") tools, customer relationship management ("CRM") products, enterprise resource planning ("ERP") products, enterprise marketing products, financials applications, and/or procurement applications. The application products are hosted on computing hardware operated by the cloud provider.

Server 1320 may also manage the storage of the collected data into one or more datastores 1340. Datastore 1340 includes any combination of hardware and software that allows for ready access to the data that is located at a computer readable storage device. For example, datastore 1340 could be implemented as computer memory operatively managed by an operating system. The data in datastore 1340 could also be implemented as database objects and/or files in a file system.

One or more users may exist at one or more user stations 1354 that interact with the architecture 1300. User station 1354 includes any type of computing station that may be used to operate or interface with architecture 1300. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the architecture 1300, such as a mouse or keyboard to manipulate a pointing object in a graphical user interface to generate user inputs.

Either server 1320 or the user at user station 1354 may provide control signals to gateway 1302 to control the operation of the gateway 1302 and/or the local devices 1310*a-c*. The control signals may be used to control any operation necessary at the gateway and/or local device 1310*a-c*, including for example, to update and provision control software on the gateway and/or to control operation of the local device. Further details of the functionality of architecture 1300, which can be used in conjunction with fleet item linking/unlinking network/system 150 of FIG. 1, is disclosed in U.S. Pat. No. 10,382,294.

In embodiments, the generated sensor messages are generated as a specialized data structure that includes attributes of sensors, vehicles, etc. In embodiments, the specialized data structure is in the form of an electronic document (e.g., an XML document) and is stored in database 17. A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

As disclosed embodiments automatically link/unlink inventory items during a fleet management trip. With sensor link/unlink information provided during trip planning, the inventory items can be tracked automatically in real-time and seamlessly without human intervention. Planning errors such as assignment of the same sensor on multiple trips during the same time period can be detected early and reported. Embodiments allows optimal reuse of sensors across trips and inventories if the pickup and drop off stops do not overlap, where the handoffs between trips or inventory items of the same trip are automatic and seamless.

With embodiments, invalid sensor information provided or attempts to link busy sensors do not affect any other business operation—such errors are recorded. Further, the users are guided to rectify errors in real-time until the inventory is dropped off at the planned drop stop. Embodiments automatically try to resolve errors, which results in faster error resolution.

Further, as disclosed, embodiments implement a dynamic hierarchical digital twin so that the transaction hierarchy between planned transportation entities can get established and on successful linking, the IoT data correlation happens seamlessly and helps in formation of the digital twin for dynamically associated entities. Using the dynamic hierarchical digital twins feature, embodiments can monitor the IoT enabled transportation entities all the way from transport equipment to packages down to the Item level and monitor the correlation of equipment to packages and package to items to provide a relational view to business users and achieve a real time preview of an exception or a spike in sensory signals of either of an equipment or a package and then correlate the impacted inventory items and appropriately flag them for quality checks on arrival at the destination location.

Embodiments provide dynamic visibility of all the sensorized transportation entities while on the move and at the same time allow correlation with the inventory items to easily narrow down the impacted items in case of an excursion and enable quality checks. An erroneous situation arising out of incorrect or invalid associations or even instances of missed pick-ups or incorrect deliveries can be upfront noticeable due to non-visible correlations. The information is available for the planned association duration and only data for that duration is rendered and post dissociation the linkage status of the dissociated entity changes to "False". Further, embodiments provide ease of filtering the entities where the linkage status is "True" vs "False".

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of monitoring one or more inventory items corresponding to a vehicle, the method comprising:
generating a trip plan comprising, for the vehicle, a start location, an end location, one or more stops, and a planned sequence of stops, each stop having a corresponding geofence, and for each of the inventory items, a pickup location and a drop off location corresponding to the one or more stops;
for each of the inventory items, detecting that the vehicle has exited the pickup location based on the trip plan and corresponding geofence and in response automatically linking a sensor to the inventory item, wherein the sensor comprises an Internet of Things (IoT) device that transmits geo-location messages and the automatic linking comprises automatically updating a database table linking the sensor to the corresponding inventory item; and
for each of the inventory items, detecting that the vehicle has entered the drop off location based on the trip plan and corresponding geofence and in response automatically unlinking the sensor from the inventory item, wherein the automatic unlinking comprises automatically updating the database table to remove a previous linking of the sensor to the corresponding inventory item.

2. The method of claim 1, the automatically linking the sensor to the inventory item further comprising setting a link field on the database to true.

3. The method of claim 1, wherein the generating the trip plan comprises automatically detecting and resolving validation errors based on invalid sensor information.

4. The method of claim 1, wherein the generating the trip plan comprises a trip and a plurality of sub-entities of the trip, and each of the sub-entities can be tracked using the corresponding sensor.

5. The method of claim 4, further comprising a dynamic hierarchical digital twin for each of the sub-entities that are based on dynamic associations that occur during the trip.

6. The method of claim 5, dynamic hierarchical digital twin comprising a JavaScript Object Notation (JSON) file.

7. The method of claim 5, further comprising generating a user interface that displays the dynamic associations during the trip.

8. A non-transitory computer-readable medium having instructions stored thereon that, when executed by one or more processors, cause the processors to monitor one or more inventory items corresponding to a vehicle, the monitoring comprising:
generating a trip plan comprising, for the vehicle, a start location, an end location, one or more stops, and a planned sequence of stops, each stop having a corresponding geofence, and for each of the inventory items, a pickup location and a drop off location corresponding to the one or more stops;
for each of the inventory items, detecting that the vehicle has exited the pickup location based on the trip plan and corresponding geofence and in response automatically linking a sensor to the inventory item, wherein the sensor comprises an Internet of Things (IoT) device that transmits geo-location messages and the automatic linking comprises automatically updating a database table linking the sensor to the corresponding inventory item; and
for each of the inventory items, detecting that the vehicle has entered the drop off location based on the trip plan and corresponding geofence and in response automatically unlinking the sensor from the inventory item, wherein the automatic unlinking comprises automatically updating the database table to remove a previous linking of the sensor to the corresponding inventory item.

9. The computer-readable medium of claim 8, the automatically linking the sensor to the inventory item further comprising setting a link field on the database to true.

10. The computer-readable medium of claim 8, wherein the generating the trip plan comprises automatically detecting and resolving validation errors based on invalid sensor information.

11. The computer-readable medium of claim 8, wherein the generating the trip plan comprises a trip and a plurality of sub-entities of the trip, and each of the sub-entities can be tracked using the corresponding sensor.

12. The computer-readable medium of claim 11, further comprising a dynamic hierarchical digital twin for each of the sub-entities that are based on dynamic associations that occur during the trip.

13. The computer-readable medium of claim 12, dynamic hierarchical digital twin comprising a JavaScript Object Notation (JSON) file.

14. The computer-readable medium of claim 12, the monitoring further comprising generating a user interface that displays the dynamic associations during the trip.

15. A fleet monitoring system for monitoring one or more inventory items corresponding to a vehicle, the system comprising:
a sensor message receiving module;
one or more processors that execute instructions to, in response to receiving sensor messages from the message receiving module:
generating a trip plan comprising, for the vehicle, a start location, an end location, one or more stops, and a planned sequence of stops, each stop having a corresponding geofence, and for each of the inventory items, a pickup location and a drop off location corresponding to the one or more stops;
for each of the inventory items, detecting that the vehicle has exited the pickup location based on the trip plan and corresponding geofence and in response automatically linking a sensor to the inventory item, wherein the sensor comprises an Internet of Things (IoT) device that transmits geo-location messages and the automatic linking comprises automatically updating a database table linking the sensor to the corresponding inventory item; and
for each of the inventory items, detecting that the vehicle has entered the drop off location based on the trip plan and corresponding geofence and in response automatically unlinking the sensor from the inventory item, wherein the automatic unlinking comprises automatically updating the database table to remove a previous linking of the sensor to the corresponding inventory item.

16. The fleet monitoring system of claim 15, the automatically linking the sensor to the inventory item further comprising setting a link field on the database to true.

17. The fleet monitoring system of claim 15, wherein the generating the trip plan comprises automatically detecting and resolving validation errors based on invalid sensor information.

18. The method of claim 1, wherein the geo-location messages are received via a gateway sensor that is configured to communicate with a plurality of IoT devices having different protocols and converting the different protocols to a standard protocol.

19. The computer-readable medium of claim 8, wherein the geo-location messages are received via a gateway sensor that is configured to communicate with a plurality of IoT devices having different protocols and converting the different protocols to a standard protocol.

20. The fleet monitoring system of claim 15, wherein the sensor message receiving module comprises a gateway sensor that is configured to communicate with a plurality of IoT devices having different protocols and converting the different protocols to a standard protocol.

* * * * *